Patented Dec. 10, 1929

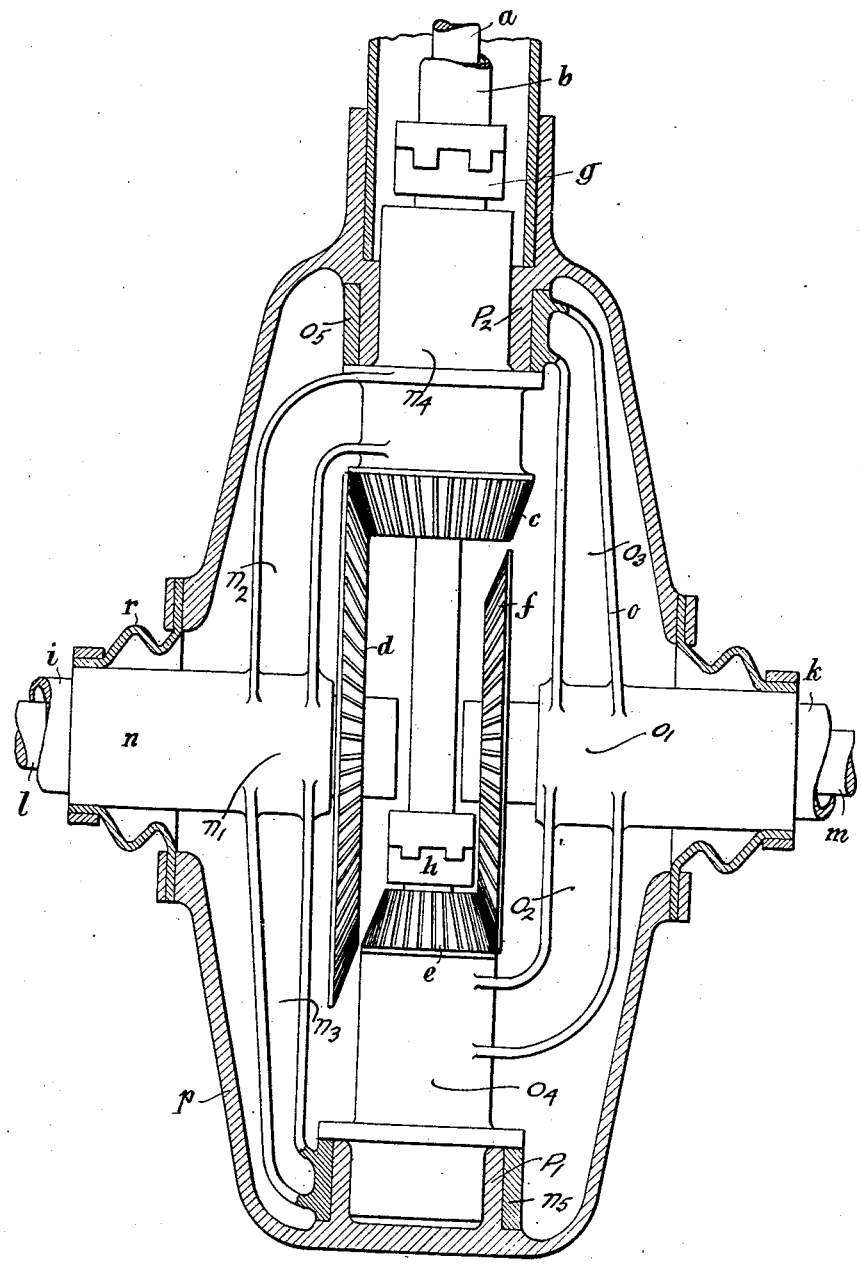

1,739,129

UNITED STATES PATENT OFFICE

WALTER DOBLHOFF, OF BERNDORF, AUSTRIA

MOTOR-VEHICLE TRANSMISSION MECHANISM

Application filed March 6, 1928, Serial No. 259,507, and in Austria March 26, 1927.

My invention relates to a motor vehicle transmission mechanism, more particularly to that type wherein the axle sections are arranged for pivotal movement as an incident to reducing the unsprung weight, and it has for its object to provide apparatus of this character such that the gear elements may be supported in proper meshing relation and maintained in that relation for a comparatively long time.

In accordance with my invention, the bearings of each wheel driven from the transmission are mounted in a swinging piece or bracket member, and the swinging bracket members of the transmission are so arranged as to secure the same exactness with respect to relative positions of the gears as if the wheels and their bearings were mounted in fixed relation with respect to the machine frame. To this end, the mechanism embodies bracket members pivotally connected together and arranged to support, or be connected to, the associated vehicle wheels, the bracket members carrying intermediately thereof bevel gears which mesh with bevel pinions carried by suitable bearing portions provided on the bracket members, the bevel pinions being aligned with the pivotal axis of the bracket members and being driven by suitable telescopic shaft connections. The manner of supporting the various gears, that is, having the bevel gears carried by intermediate bearing portions of the bracket members and having the bevel pinions carried by terminal bearing portions on the bracket members, together with the improved bearing relation existing between the bracket members, assures that proper meshing relation of the gears may be secured and maintained.

Apparatus made in accordance with my invention is illustrated in the accompanying drawing showing a sectional view of my improvement.

The telescopic shafts including an inner shaft $a$ and an outer hollow shaft $b$ are driven by suitable differential gearing in a manner well known in the art, it being preferable to locate the differential gearing somewhere intermediate of the length of the vehicle. The outer hollow shaft $b$ is connected at its inner end to a bevel pinion $c$, which meshes with a bevel gear $d$, the latter being supported and connected to an axle section. The inner shaft $a$ extends through the hollow shaft $b$, the bevel pinion $c$, and it is connected to a bevel pinion $e$ meshing with a bevel gear $f$ arranged in opposed relation to the bevel gear $d$ and connected to the other axle section. The vehicle wheels (not shown) are supported by the axle tubes $i$ and $k$ and the vehicle wheels are driven by the shafts $l$ and $m$ arranged within the tubes $i$ and $k$ and connected to the bevel gears $d$ and $f$, respectively.

Referring now to the means for supporting the gears, shafts and the axle sections, I provide pivotal pieces or bracket members. The bracket member $n$ has an intermediate bearing portion $n'$, a short arm $n^2$ and a long arm $n^3$, the short arm terminating in a trunnion portion $n^4$ and the long arm terminating in a sleeve bearing portion $n^5$, the axis of the trunnion $n^4$ and of the sleeve bearing portion $n^5$ being arranged normally with respect to the intermediate bearing portion $n'$. Likewise, the bracket member or piece $o$ has an intermediate bearing portion $o'$, arms $o^2$ and $o^3$, the arms terminating in the trunnion and bearing portions $o^4$ and $o^5$, respectively.

The gears and the bracket members $o$ and $n$ are arranged within a housing $p$ preferably fixedly secured to the vehicle frame. The housing $p$ is provided with diametrically opposed and inwardly extending bearing sleeve portions $p'$ and $p^2$, that is, sleeves having inner and outer cylindrical bearing surfaces, the inner cylindrical bearing surfaces cooperating with the external cylindrical bearing surfaces of the trunnion portions $n^4$ and $o^4$ and the external cylindrical bearing surfaces cooperating with the internal bearing surfaces of the bearing sleeve portions $n^5$ and $o^5$. In this way, it is assured that the bracket members or pieces $n$ and $o$ may be secured in pivotal relation in a very accurate way, particularly as the bearing sleeve portions $p'$ and $p^2$ of the housing are each arranged to support the adjacent terminal bearing portions of both bracket members. As the driving pinions $c$ and $e$ are carried by the trunnion portions $o^4$ and $n^4$ and the gears $d$ and $f$ are carried by the intermediate bearing portions $n'$ and $o'$, coaxial relation of the bracket member pivot means being secured and maintained by the apparatus just referred to, accurate meshing relation of the gears results and one which is maintained even though associated shafts and bearings therefor should undergo considerable wear.

The housing $p$ is provided with suitably large lateral openings to permit of the requisite up and down pivotal movement of the axial tubes $i$ and $k$ and suitable flexible cuffs are provided in connection with the openings and with the axial tubes to close the housing.

If, for any reason, for example, due to relative wear, the shafts $a$ and $b$ should not be required to be exactly in coaxial relation with respect to the driving bevel pinions $c$ and $e$, then suitable relative lateral movement may be provided between the respective shafts and pinions by means of the couplings $g$ and $h$. If desired, similar couplings may be arranged between the bevel gears $d$ and $f$ and the driving axial shaft sections $l$ and $m$.

From the foregoing, it will be apparent that I have provided an arrangement for supporting the gearing of a motor vehicle transmission mechanism of the type embodying pivotally mounted axle sections wherein the pivotal members are so arranged that a very accurate pivotal connection is provided, the gears are accurately supported by the pivotal or bracket members and the connections of the gears to the various shaft elements are such as not to disturb the bearing relations of the gears with respect to the pivotal or bracket members.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:—

1. In a motor vehicle transmission mechanism, the combination of a housing having diametrically opposed and coaxial bearing portions, a pair of bracket members, each bracket member having an intermediate bearing portion and a pair of arms terminating in bearing portions whose axis is normal to the axis of the intermediate bearing portion, said terminal bearing portions fitting the housing bearing portions, first and second bevel gears carried by the intermediate bearing portions, first and second bevel pinions carried by terminal bearing portions, a hollow shaft connected to the first pinion, and an internal shaft extending through the hollow shaft, the first pinion, transversely of the housing and connected to the second pinion.

2. In a motor vehicle transmission mechanism, the combination of a housing having diametrically opposed and coaxial bearing portions, a pair of bracket members, each bracket member having an intermediate bearing portion and a pair of arms terminating in bearing portions whose axis is normal to the axis of the intermediate bearing portion, said terminal bearing portions fitting the housing bearing portions, first and second bevel gears carried by the intermediate bearing portions, first and second bevel pinions carried by terminal bearing portions, a hollow shaft connected to the first pinion, an internal shaft extending through the hollow shaft, the first pinion, transversely of the housing and connected to the second pinion, and couplings between the pinions and the shafts and providing for sufficient play to prevent pinching.

3. In a motor vehicle transmission mechanism, the combination of a housing having diametrically opposed bearing portions, a pair of bracket members, each bracket member having an intermediate bearing portion and a pair of arms, one of the arms of each pair having connected thereto a trunnion member while the other arm of such pair has connected thereto a sleeve bearing member, the bracket members being so arranged that the trunnion and sleeve bearing portions are respectively adjacent, said trunnion and sleeve bearing portions being supported by the bearing portions of said housing, bevel gears supported by the intermediate bearing portions, bevel pinions meshing with the bevel gears and supported by said trunnion portions, and telescopically arranged shafts connected respectively to the bevel pinions.

4. In a motor vehicle transmission mechanism, the combination of a housing having diametrically opposed and inwardly-projecting sleeve members providing internal and external bearing surfaces, a pair of bracket members, each bracket member having an intermediate bearing portion and a pair of arms, one arm of each pair terminating in a trunnion portion having an external bearing surface while the other arm of such pair terminates in a sleeve bearing portion having an internal bearing surface, the bracket members being so arranged that the external bearing surfaces of the trunnion portions fit the internal bearing surfaces of the housing sleeve portions and the internal bearing surfaces of the arm sleeve bearing portions fit the external bearing surfaces of the housing sleeve portions, a pair of bevel gears supported by the intermediate bearing portions of the bracket members, bevel pinions supported by the trunnion portions of the bracket members and meshing, respectively, with the bevel gears, and telescopically arranged shafts connected to the bevel pinions.

In witness whereof I have hereunto signed my name.

WALTER DOBLHOFF.